US006745113B2

(12) United States Patent
Griffin, III et al.

(10) Patent No.: US 6,745,113 B2
(45) Date of Patent: Jun. 1, 2004

(54) METHOD AND SYSTEM FOR AUTOFLIGHT INFORMATION DISPLAY

(75) Inventors: John C. Griffin, III, University Place, WA (US); Randall J. Mumaw, Seattle, WA (US)

(73) Assignee: The Boeing Company, Seattle, WA (US)

( * ) Notice: Subject to any disclaimer, the term of this patent is extended or adjusted under 35 U.S.C. 154(b) by 5 days.

(21) Appl. No.: 10/165,542

(22) Filed: Jun. 7, 2002

(65) Prior Publication Data

US 2003/0229426 A1 Dec. 11, 2003

(51) Int. Cl.$^7$ .............................................. G01C 23/00
(52) U.S. Cl. ............................. 701/3; 701/11; 701/14; 340/971
(58) Field of Search ......................... 701/3, 7, 11, 14; 340/971, 973; 244/175, 195

(56) References Cited

U.S. PATENT DOCUMENTS

| 4,247,843 | A | * | 1/1981 | Miller et al. ................. 340/973 |
| 4,325,123 | A | | 4/1982 | Graham et al. |
| 4,860,007 | A | * | 8/1989 | Konicke et al. ............ 340/973 |
| 5,420,582 | A | | 5/1995 | Kubbat et al. |
| 5,978,715 | A | * | 11/1999 | Briffe et al. ................... 701/11 |
| 6,057,786 | A | * | 5/2000 | Briffe et al. ................. 340/975 |
| 6,085,129 | A | | 7/2000 | Schardt et al. |
| 6,112,141 | A | | 8/2000 | Briffe et al. |
| 6,188,937 | B1 | * | 2/2001 | Sherry et al. ................. 701/14 |
| 6,389,333 | B1 | * | 5/2002 | Hansman et al. ............... 701/3 |
| 2003/0058134 | A1 | * | 3/2003 | Sherry et al. ................ 340/945 |
| 2003/0132860 | A1 | * | 7/2003 | Feyereisen et al. ......... 340/973 |

OTHER PUBLICATIONS

Hutchins, Edwin, "The Integrated Mode Management Interface," Department of Cognitive Science, University of California, San Diego, Sep. 17, 1996.

The Boeing Company, 777–200/–200ER/–300 Operations Manual, Copyright 1994.

The Boeing Company, 777 Quick Reference Handbook, Copyright Jun. 26, 2000.

The Boeing Company, 777 Operations Manual, Copyright Dec. 7, 2001.

777 Flight Deck (1 page) http://www.meriweather.com/777/777_main.html [Accessed Jan. 28, 2003].

Lindenfeld, "What is an FMS?", Flight Management Systems (5 pages) http://www.ultranet.com/~marzgold/FAQ–FMS.html [Accessed Jun. 3, 2002].

Meriweather's Flight Deck Flight Acronyms & Definitions (4 pages) http://www.meriweather.com/fd/def.html [Accessed Jun. 3, 2002].

U.S. patent application Ser. No. 10/251,493, Boorman et al., filed Sep. 20, 2002.

* cited by examiner

Primary Examiner—Michael J. Zanelli
(74) Attorney, Agent, or Firm—Perkins Coie LLP

(57) ABSTRACT

A method and system for autoflight information display. A method in accordance with one embodiment of the invention includes determining if an automatic aircraft controller is controlling an aircraft function based at least in part on a target aircraft speed. If so, the method further includes displaying alphanumeric information corresponding to the operation of the automatic aircraft controller at a first location of a display medium. If not, the method further includes displaying the alphanumeric information at a second location of the display medium different than the first location. The first location can be aligned with a display of the aircraft speed, and the second location can be aligned with a display of the aircraft altitude. In another embodiment of the invention, engine control information can be integrated with a display of aircraft autopilot and/or autothrottle information.

90 Claims, 13 Drawing Sheets

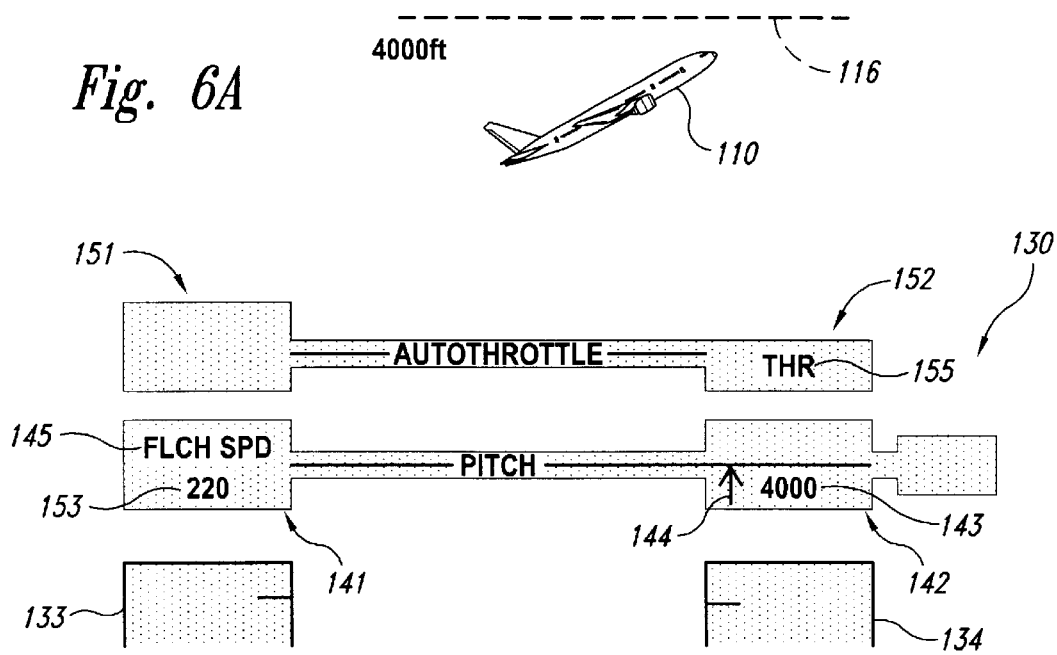
*Fig. 6A*
*Fig. 6B*
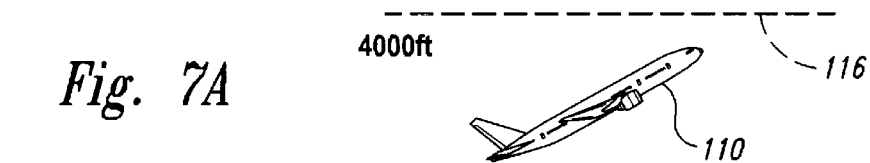
*Fig. 7A*
*Fig. 7B*

METHOD AND SYSTEM FOR AUTOFLIGHT INFORMATION DISPLAY

TECHNICAL FIELD

The present invention relates generally to methods and apparatuses for displaying autoflight information, such as autothrottle and/or autopilot mode information.

BACKGROUND

Modern commercial transport aircraft are controlled by automatic flight control devices during many and sometimes all segments of a typical flight. The automatic flight control devices typically include an autothrottle that controls engine thrust, and an autopilot that controls both pitch attitude (via the aircraft elevators) and roll attitude (via the aircraft ailerons). Information regarding the status and activities of the flight control devices is typically displayed on a display device, such as a CRT, LCD or other graphical user interface.

FIG. 1 illustrates a typical display device 10 that presents a display 30 in accordance with the prior art. The display 30 includes an air speed display 33, an altitude display 34, an attitude display 35, and a heading display 36. The display 30 also includes a series of annunciators, each indicating (via a textual shorthand) which of a variety of pre-defined modes a corresponding one of the automatic flight control devices is operating in. For example, the display 30 can include an autothrottle mode annunciator 55, a roll mode annunciator 66, and a pitch mode annunciator 45. In the particular configuration shown in FIG. 1, "SPD" indicates that the aircraft autothrottle is controlling the engine thrust based on a target aircraft speed. "LOC" indicates that the roll control portion of the autopilot is controlling to maintain a track on a localizer beam, and "G/S" indicates that the pitch control portion of the autopilot is controlling the elevators based on a target glide slope.

FIG. 2 illustrates a separate display device 10a that presents an engine indication display 60 in accordance with the prior art. The display 60 can include graphical depictions of the exhaust pressure ratio (EPR), engine RPM (N1) and exhaust gas temperature (EGT) for each engine. The display 60 can also include a textual thrust limit indicator 62a, a numerical thrust limit indicator 62b, and a numerical actual thrust indicator 61.

One drawback with the display 30 described above with reference to FIG. 1 is that the mode annunciators are relatively cryptic and require the pilot to memorize the type of action performed by each flight control device in each mode. A drawback with the engine indication display 60 shown in FIG. 2 is that it requires the pilot to look at a separate display for engine information. Accordingly, the pilot may need to move his or her eyes back and forth between multiple displays to understand various aspects of the flight control operation.

SUMMARY

The present invention is directed toward methods and systems for displaying information corresponding to the operation of automatic aircraft controllers. The method can be implemented on a computer, a computer readable medium, or a computer system. For example, if the automatic aircraft controller is controlling an aircraft function based at least in part on a target aircraft speed, the method can include displaying alphanumeric information corresponding to the operation of the automatic aircraft controller at a first location of a display medium. The method can further include (if the automatic aircraft controller is not controlling the aircraft function based at least in part on the target aircraft speed), displaying the alphanumeric information at a second location of the display medium different than the first location.

In a further aspect of the invention, the method can include displaying an aircraft speed at a first region of the display medium and displaying an aircraft altitude at a second region of the display medium different than the first region. Displaying the alphanumeric information at the first location can include displaying at least a portion of the alphanumeric information at least proximate to the first region of the display medium, and displaying the alphanumeric information at the second location can include displaying at least a portion of the alphanumeric information at least proximate to the second region of the display medium. In one aspect of the invention, the automatic aircraft controller can include an autopilot, and in another aspect of the invention, the automatic aircraft controller can include an autothrottle. In still a further aspect of the invention, the automatic aircraft controller can operate according to a plurality of predetermined modes, and displaying alphanumeric information can include displaying alphanumeric information corresponding to an identity of at least one of the modes.

A method in accordance with another aspect of the invention includes displaying information corresponding to the operation of an aircraft engine. The method can include displaying on a display medium first information corresponding to an operation of at least one of an aircraft autopilot and an aircraft autothrottle. The method can further include displaying on the display medium second information corresponding to a performance of an aircraft engine, with the second information being positioned at least proximate to the first information on the display medium. In a further aspect of the invention, the second information can include at least one of a thrust limit and an actual thrust level, and in yet a further aspect, the second information can include a graphical representation of the actual thrust level.

BRIEF DESCRIPTION OF THE DRAWINGS

FIG. 6A is a pictorial illustration of an aircraft in a partial power climb, and FIG. 6B illustrates a portion of a display having corresponding flight control information in accordance with an embodiment of the invention.

FIG. 7A is a pictorial illustration of an aircraft climbing at a constant air speed and constant vertical speed, and FIG. 7B illustrates a portion of a display having corresponding flight control information in accordance with an embodiment of the invention.

DETAILED DESCRIPTION

The present disclosure describes systems and methods for displaying flight control information. Many specific details of certain embodiments of the invention are set forth in the following description and in FIGS. 3A–13B to provide a thorough understanding of these embodiments. However, the present invention can have additional embodiments, and may be practiced without several of the details described below.

Figure 1:
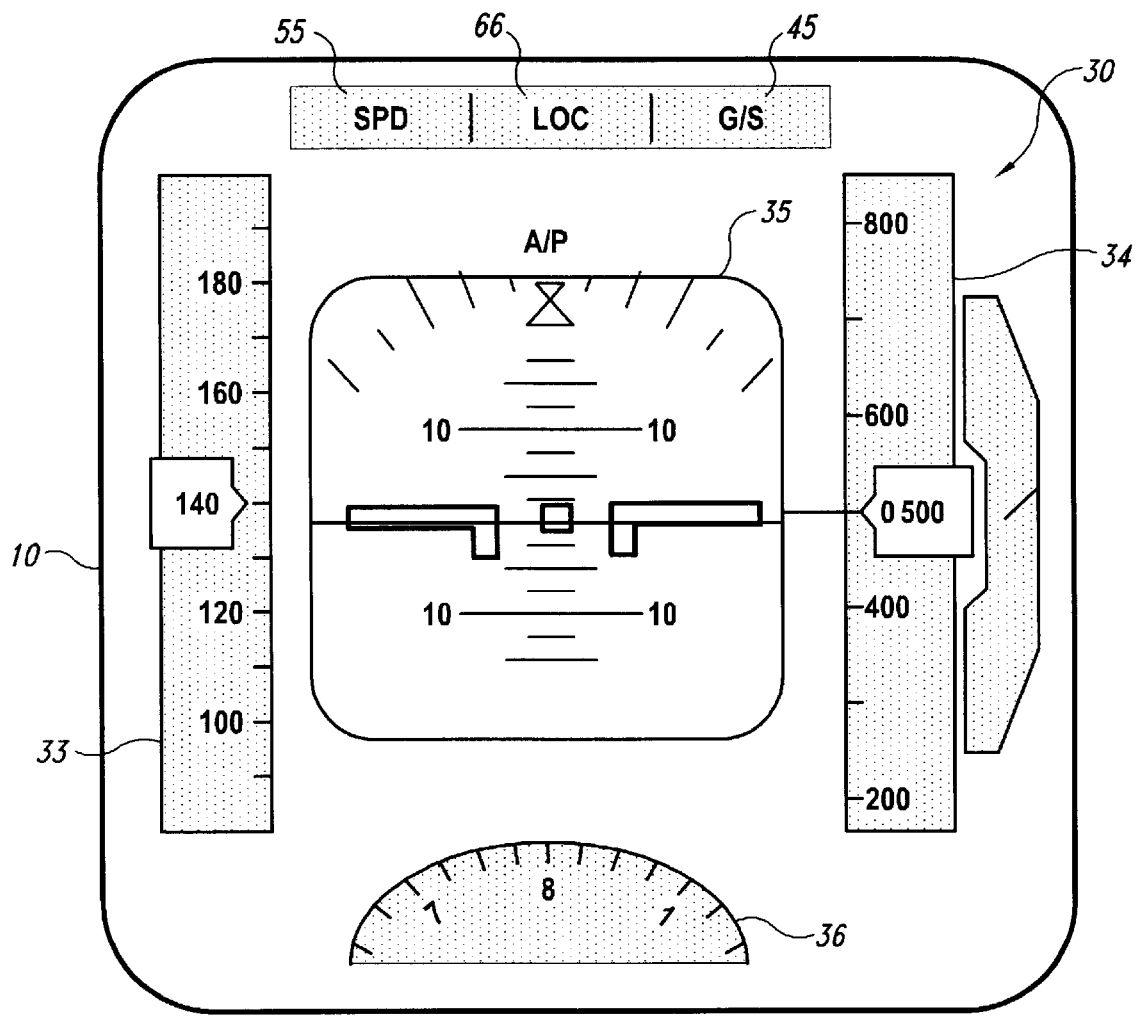
FIG. 1 illustrates a flight display in accordance with the prior art.
Figure 2:
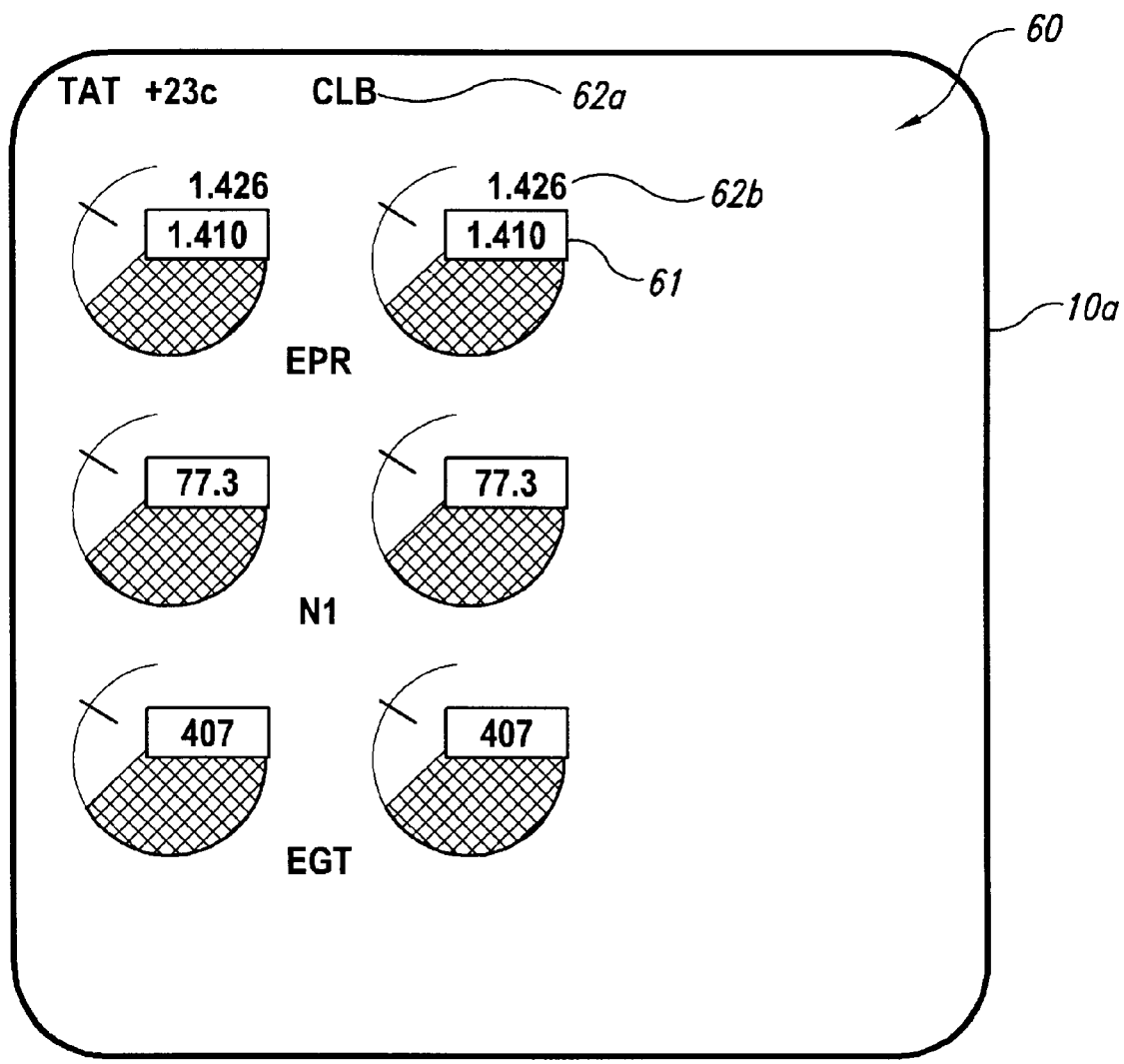
FIG. 2 illustrates an engine indication display in accordance with the prior art.
Figure 3A:
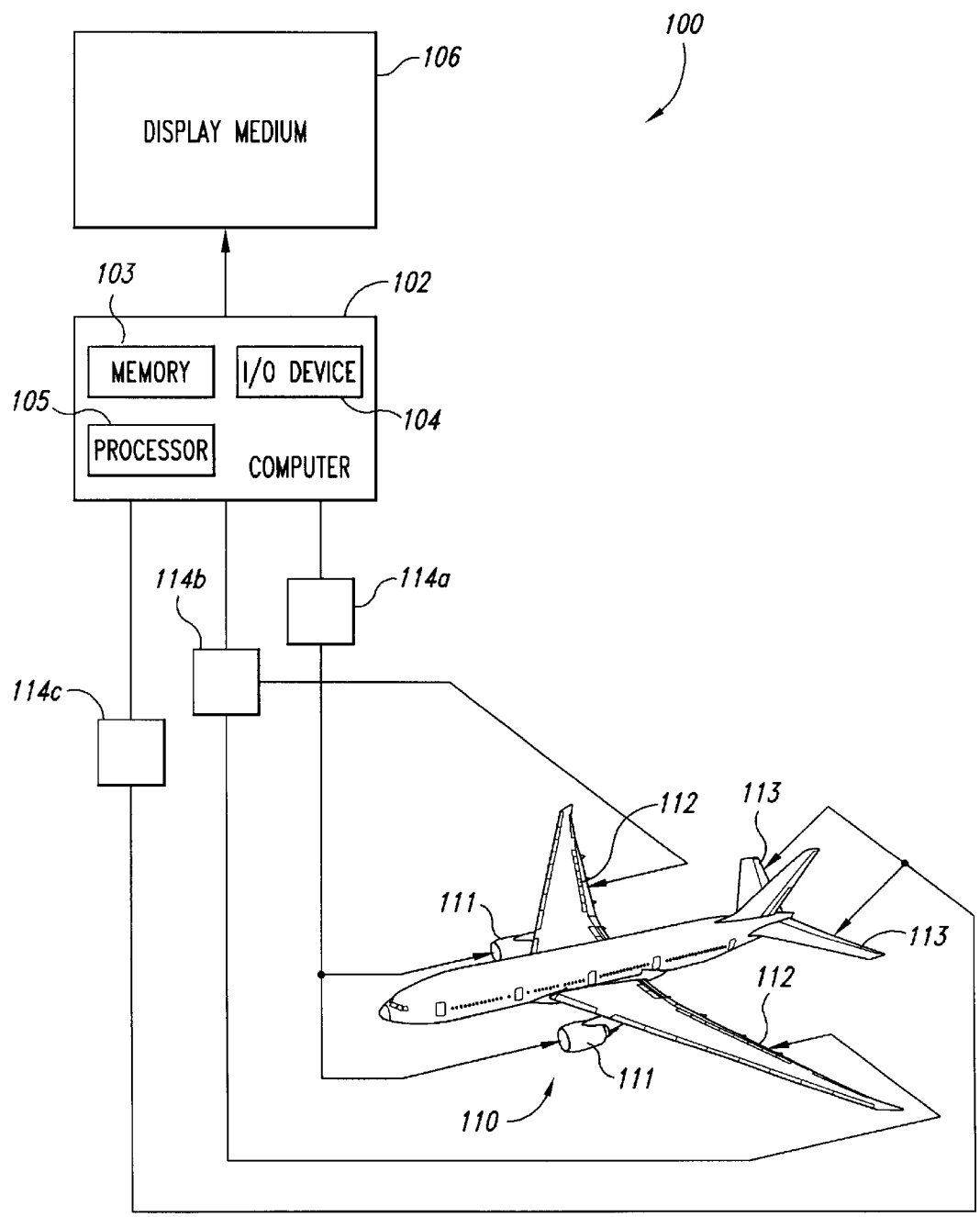
FIG. 3A is a schematic illustration of a system for controlling aircraft functions in accordance with an embodiment of the invention.

FIG. 3A is a schematic illustration of a system 100 installed on an aircraft 110 to automatically control functions of the aircraft operation and display information regarding the status of aircraft automatic controls in accordance with an embodiment of the invention. The information displayed by the system 100 can change location, depending upon the manner in which the aircraft is being controlled. Accordingly, the pilot can readily notice and understand changes in the status and operation of the automatic controls.

In one aspect of this embodiment, the system 100 can include one or more computers 102 (schematically illustrated in FIG. 3A as a single computer 102). The computer 102 can include a memory 103, a processor 105, and an input/output device 104. The computer 102 can be linked to one or more controllers 114, such as an engine controller or autothrottle 114a, a roll controller 114b, and a pitch controller 114c. The engine controller 114a can be operatively coupled to engines 111 of the aircraft 110 to automatically control engine functions, such as engine thrust. The roll controller 114b can be operatively coupled to ailerons 112 of the aircraft 110, and the pitch controller 114c can be operatively coupled to elevators 113 of the aircraft 110. In one embodiment, the roll controller 114b and the pitch controller 114c can form a portion of an integrated autopilot device. In another embodiment, the roll controller 114b and the pitch controller 114c can be independent. In either embodiment, the controllers 114a–c can automatically control the aircraft thrust, roll, and pitch.

In one embodiment, the display 130 can include a pitch mode display 140 and a roll mode display 165 that together describe the function of an aircraft autopilot (e.g., the roll controller 114b and pitch controller 114c described above with reference to FIG. 3A). The roll mode display 165 can include a roll mode indicator 166 that displays text corresponding to a preselected mode of roll control. The display 130 can also include an autothrottle mode display 150 that describes the function of the aircraft autothrottle (e.g., the engine controller 114a described above with reference to FIG. 3A). The autothrottle mode display 150 can have a thrust display portion 160 that has a graphical and/or textual illustration of the thrust limit 162 and the actual thrust 161 applied to the aircraft engines 111 (FIG. 3A).

The computer 102 can also be coupled to a display medium 106 which is configured to display to the pilot information corresponding to the operation of the controllers 114. Instructions for displaying the information on the display medium 106 can be stored in the memory 103 or any other computer readable medium, such as a medium accessible to the computer 102 via the input/output device 104.

Figure 3B:
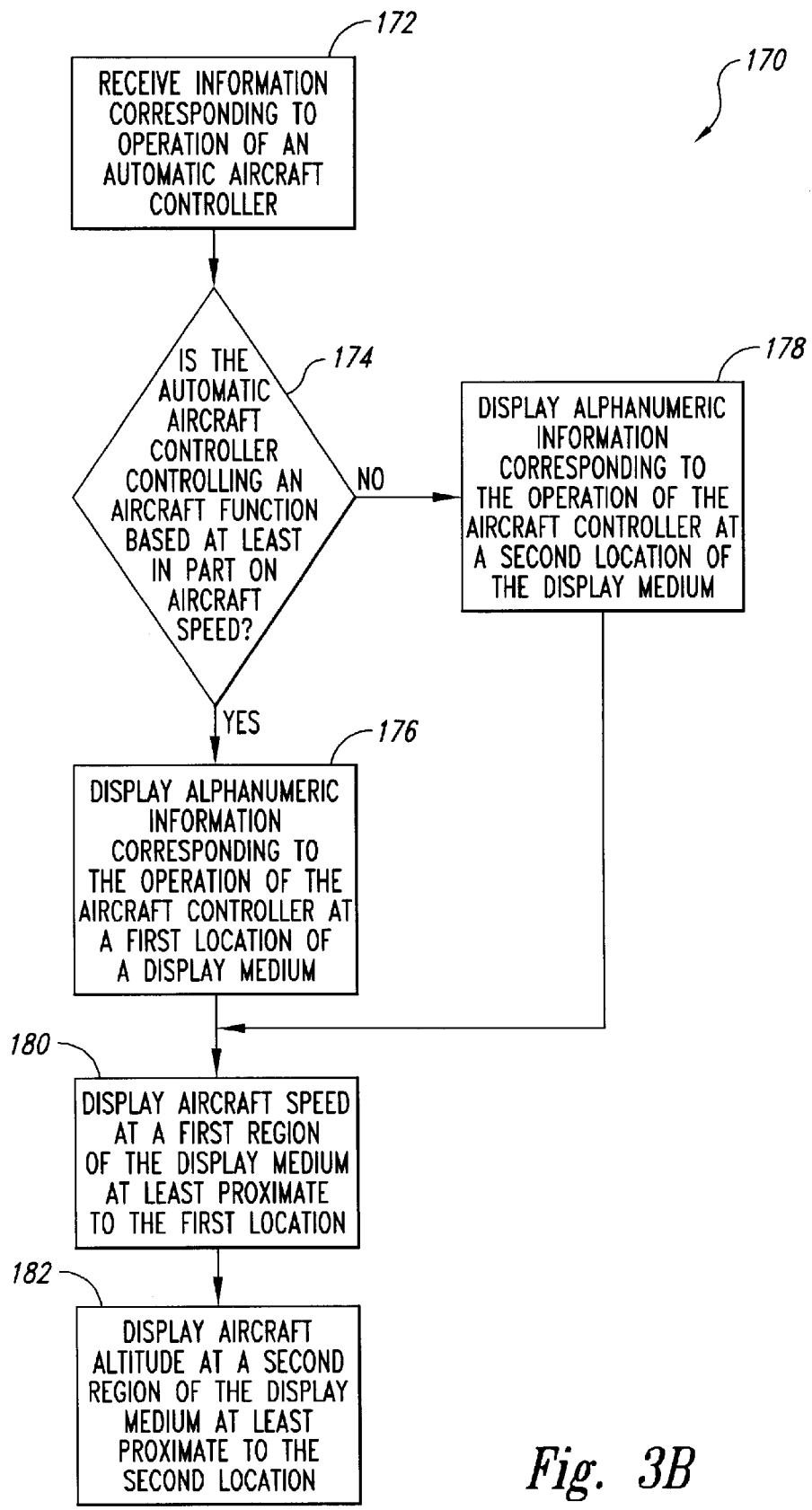
FIG. 3B is a block diagram illustrating processes performed by a system in accordance with an embodiment of the invention.

FIG. 3B is a block diagram illustrating a process 170 carried out by the system 100 (FIG. 3A) in accordance with an embodiment of the invention. In one aspect of this embodiment, the process 170 can include receiving information corresponding to the operation of an automatic aircraft controller (process portion 172). The process can further include determining whether or not the automatic aircraft controller is controlling an aircraft function based at least in part on aircraft speed (process portion 174). If the automatic aircraft controller is controlling the aircraft function based at least in part on the aircraft speed, the process can further include displaying alphanumeric information corresponding to the operation of the aircraft controller at a first location of the display medium (process portion 176). Otherwise, the process can include displaying alphanumeric information corresponding to the operation of the aircraft controller at a second location of the display medium (process portion 178).

In another aspect of this embodiment, the process 170 can include displaying aircraft speed at a first region of the display medium at least proximate to the first location (process portion 180). The process 170 can further include displaying aircraft altitude at a second region of the display medium at least proximate to the second location (process portion 182). As described in greater detail below with reference to FIGS. 4–13B, this juxtaposition can provide visual cues to the pilot that indicate the manner in which the flight control devices are controlling the aircraft.

Figure 3C:
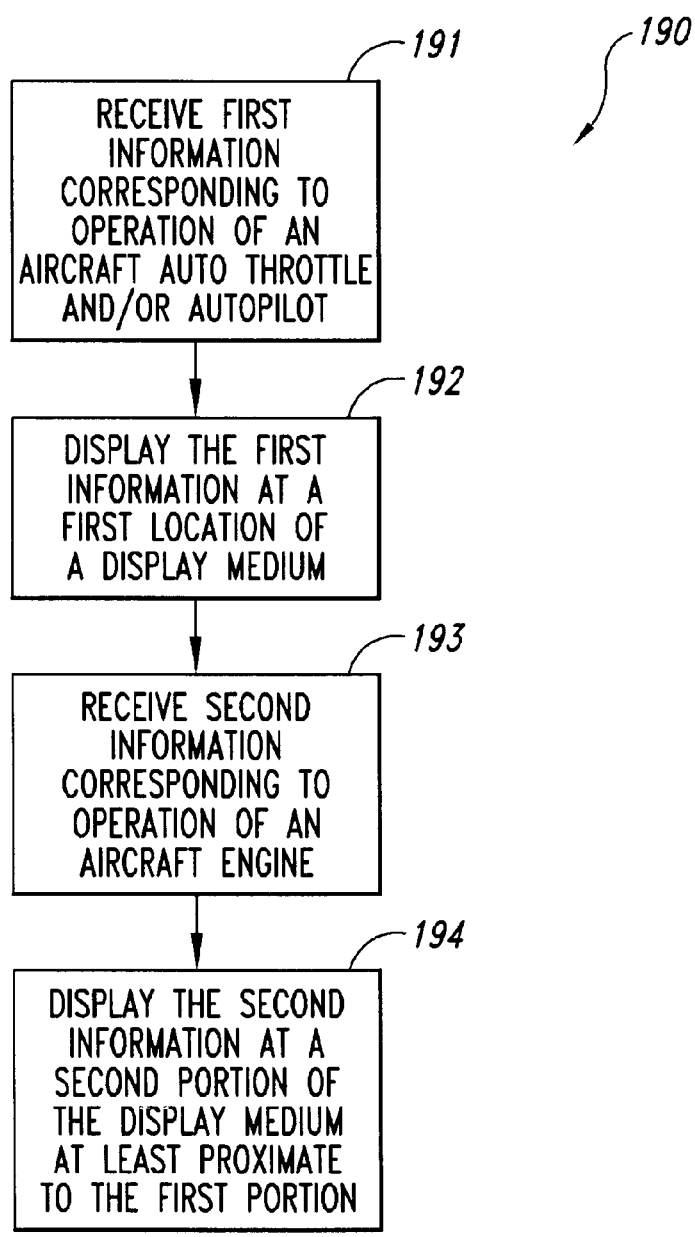
FIG. 3C is a block diagram illustrating processes performed by a system in accordance with another embodiment of the invention.

FIG. 3C illustrates another process 190 carried out by the system 100 described above with reference to FIG. 3A in accordance with another embodiment of the invention. In one aspect of this embodiment, the process 190 can include receiving first information corresponding to the operation of an aircraft autothrottle and/or autopilot (process portion 191). The process 190 can further include displaying the first information at a first location of a display medium (process portion 192). The process 190 can still further include receiving second information corresponding to the operation of an aircraft engine (process portion 193) and displaying the second information at a second portion of the display medium at least proximate to the first portion (process portion 194). As described in greater detail below with reference to FIGS. 4–13B, juxtaposing the information in this manner can make it easier for the pilot to assess the operating condition of the aircraft.

Figure 4:
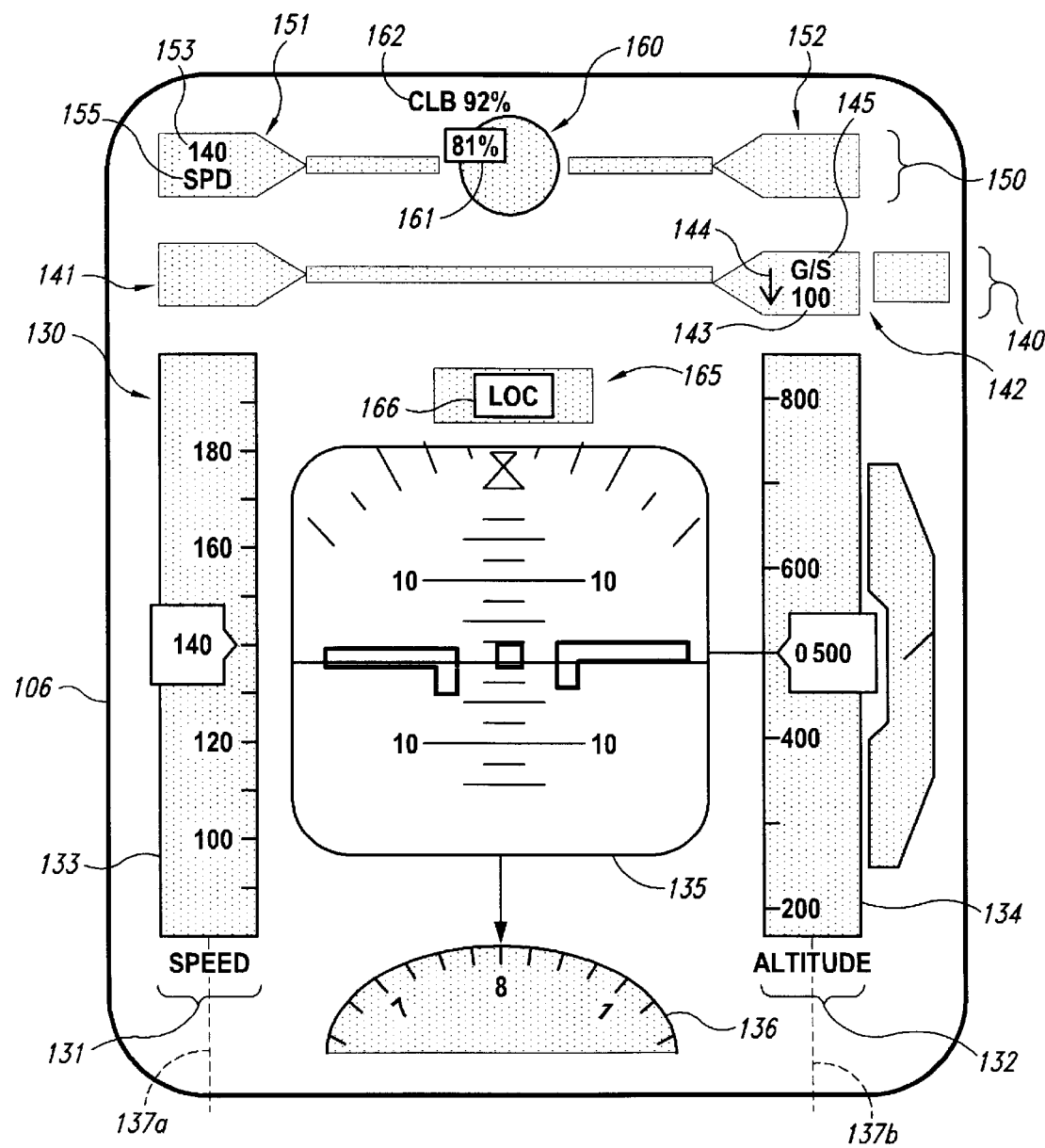
FIG. 4 is a partially schematic illustration of a display arranged in accordance with an embodiment of the invention.

FIG. 4 is an enlarged illustration of an embodiment of the display medium 106 described above with reference to FIG. 3A. The display medium 106 can present a display 130 having a variety of fields or regions at which information regarding the operation of the automatic flight control devices appears. In one embodiment, the display medium 106 can include a CRT device. In another embodiment, the display medium 106 can include an LCD device. In still further embodiments, the display medium 106 can include other devices, such as a head-up display (HUD) device. In any of these embodiments, the display medium 106 can include a single device on which the entire display 130 appears, or the display medium 106 can include a plurality of closely-spaced devices (such as closely-spaced LCD panels) which together present the entire display 130. The display 130 can include a first region 131 elongated along a first longitudinal axis 137a, and a second region 132 elongated along a second longitudinal axis 137b. An aircraft speed display 133 can be positioned in the first region 131, and an aircraft altitude display 134 can be positioned in the second region 132. An aircraft attitude display 135 and heading display 136 can be positioned between the first region 131 and the second region 132.

In one aspect of this embodiment, the system 100 can include one or more computers 102 (schematically illustrated in FIG. 3A as a single computer 102). The computer 102 can include a memory 103, a processor 105, and an input/output device 104. The computer 102 can be linked to one or more controllers 114, such as an engine controller or autothrottle 114a, a roll controller 114b, and a pitch controller 114c. The engine controller 114a can be operatively coupled to engines 111 of the aircraft 110 to automatically control engine functions, such as engine thrust. The roll controller 114b can be operatively coupled to ailerons 112 of the aircraft 110, and the pitch controller 114c can be operatively coupled to elevators 113 of the aircraft 110. In one embodiment, the roll controller 114b and the pitch controller 114c can form a portion of an integrated autopilot device. In another embodiment, the roll controller 114b and the pitch controller 114c can be independent. In either embodiment, the controllers 114a–c can automatically control the aircraft thrust, roll, and pitch.

In one embodiment, the display 130 can include a pitch mode display 140 and a roll mode display 165 that together describe the function of an aircraft autopilot (e.g., the roll controller 114b and pitch controller 114c described above with reference to FIG. 3A). The roll mode display 165 can include a roll mode indicator 166 that displays text corresponding to a preselected mode of roll control. The display 130 can also include an autothrottle mode display 150 that describes the function of the aircraft autothrottle (e.g., the engine controller 114a described above with reference to FIG. 3A). The autothrottle mode display 150 can have a thrust display portion 160 that has a graphical and/or textual illustration of the thrust limit 162 and the actual thrust 161 applied to the aircraft engines 111 (FIG. 3A).

The information corresponding to the operation of the automatic flight control devices can shift from one portion of the display 130 to another depending on whether or not the flight control device is controlling the aircraft (at least in part) on the basis of a target speed. Accordingly, the pitch mode display 140 can include a first pitch mode location 141 and a second pitch mode location 142. The autothrottle mode display 150 can include a first autothrottle mode location 151 and a second autothrottle mode location 152. In one aspect of an embodiment shown in FIG. 4, the first pitch mode location 141 and the first autothrottle mode location 151 are axially aligned with the first region 131, and the second pitch mode location 142 and the second autothrottle mode location 152 are axially aligned with the second region 132. Accordingly, information can be displayed at the first locations 141 and/or 151 when the operations of the corresponding control devices are based at least in part on aircraft speed. Information can be displayed at the second locations 142 and/or 152 when the operations of the corresponding control devices are not based at least in part on aircraft speed, for example, when these operations are based at least in part on aircraft altitude.

In one aspect of an embodiment of the display 130 shown in FIG. 4, the autothrottle mode display 150 can be positioned above the pitch mode display 140. In another embodiment, the relative positions of the autothrottle mode display 150 and the pitch mode display 140 can be reversed. In either embodiment, the autothrottle mode display 150 and the pitch mode display 140 can each present alphanumeric information corresponding to the operation of the autothrottle and the autopilot, respectively. For example, the autothrottle mode display 150 can include an autothrottle mode indicator 155 that presents (when applicable) information corresponding to which of a number of predefined modes the autothrottle is operating in. The autothrottle mode display 150 can further include a target speed indicator 153 that presents (when applicable) the aircraft speed that the autothrottle attempts to maintain as it adjusts engine thrust. In the example shown in FIG. 4, the autothrottle mode indicator 155 displays mode "SPD" and the target speed indicator 153 displays a target speed of 140 knots.

The pitch mode display 140 can include a pitch mode indicator 145 that presents (when applicable) information corresponding to which of a number of preselected modes the pitch controller is operating in. The pitch mode display 140 can further include a pitch direction indicator 144 that indicates whether the aircraft is gaining or losing altitude, and a target altitude indicator 143 that presents the aircraft altitude that the pitch controller attempts to maintain or achieve as it adjusts the aircraft elevator position. In the example shown in FIG. 4, the pitch mode indicator displays pitch mode "G/S" (glide slope), the pitch direction indicator 144 displays a downward arrow to indicate descent, and the altitude indicator displays a target altitude of 100 feet.

Some or all of the foregoing alphanumeric information can shift from a position aligned with the first region 131 to a position aligned with the second region 132, depending upon what the corresponding flight control device is controlling to. For example, as shown in FIG. 4, the autothrottle can control to a target speed of 140 knots and the pitch controller can control the aircraft to descend to 100 feet. Accordingly, the autothrottle mode indicator 155 and the target speed indicator 153 are aligned with the first region 131 (which displays aircraft speed), and the pitch mode indicator 145, target altitude indicator 143, and pitch direction indicator 144 are aligned with the second region 132 (which displays aircraft altitude). The pilot can accordingly receive a visual cue that, in autothrottle mode "SPD," it is the autothrottle rather than the autopilot that is controlling to a target aircraft speed. FIGS. 5A–13B below illustrate representative modes for both the autothrottle and the pitch controller in accordance with further embodiments of the invention.

Figure 5A:
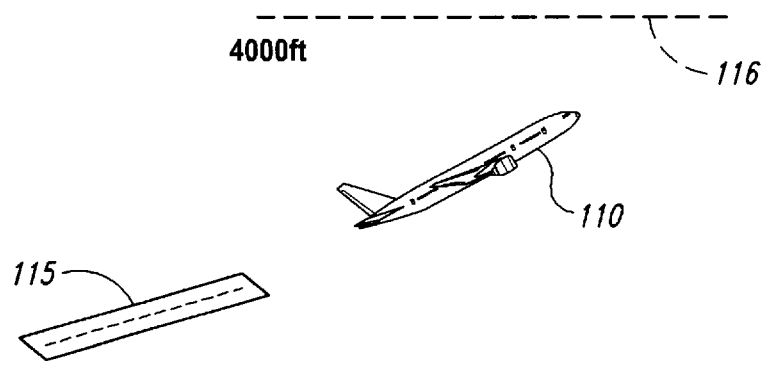
FIG. 5A is a pictorial illustration of an aircraft in a full power climb.
Figure 5B:
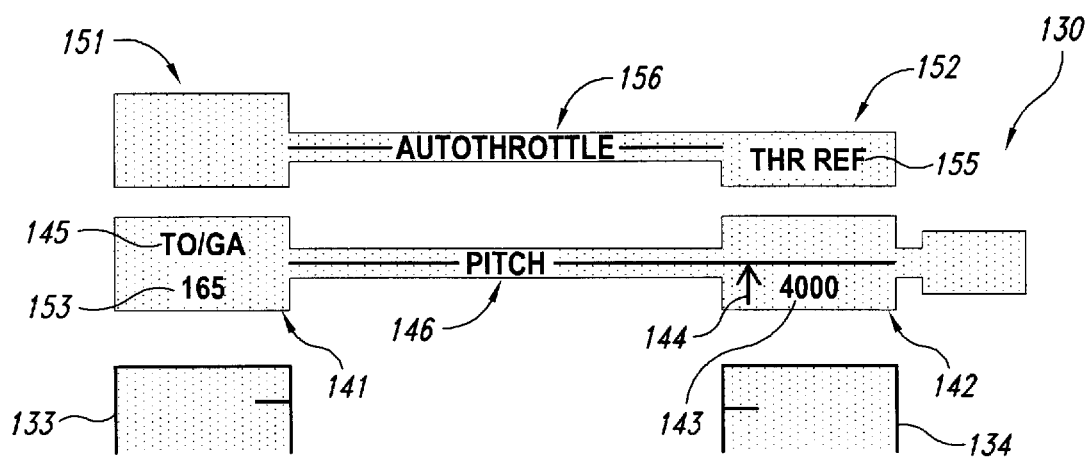
FIG. 5B illustrates a portion of a display having corresponding flight control information in accordance with an embodiment of the invention.

FIG. 5A is a pictorial illustration of an aircraft 110 that has departed from a runway 115 in a full-power climb to a target altitude of 4,000 feet, indicated by target altitude line 116. FIG. 5B illustrates a portion of the display 130 described above with reference to FIG. 4, with the automatic flight control information as it appears during this portion of the flight. For purposes of illustration, the thrust display 160 (FIG. 4) and the roll mode display 165 (FIG. 4) are not shown in FIG. 5B. The pitch mode indicator 145 has the text "TO/GA" (take-off/go-around) to indicate the pitch mode, and the target speed indicator 153 indicates that the aircraft elevators are being controlled to match a target airspeed of 165 knots. Both the pitch mode indicator 145 and the target speed indicator 153 are positioned in the first pitch mode location 141 (aligned with the aircraft speed display 133) to indicate that the pitch is being controlled to match a target aircraft speed. The pitch direction indicator 144 indicates that the aircraft is climbing, and the target altitude indicator 143 indicates that the climb is to a target altitude of 4,000 feet.

The autothrottle mode indicator 155 displays the text "THR REF" (reference thrust). The autothrottle mode indicator 155 has shifted away from the first autothrottle mode location 151 (aligned with the aircraft speed display 133), to the second autothrottle mode location 152. Accordingly, the pilot receives a visual cue that it is the autopilot, not the autothrottle, that is controlling to an aircraft speed.

In another aspect of an embodiment shown in FIG. 5B, the autothrottle mode display 150 can include an autothrottle display label 156, and the pitch mode display 140 can include a pitch display label 146, each positioned to identify the function of the respective mode display. In another embodiment (such as that described above with reference to FIG. 4), the labels 156 and 146 can be eliminated.

FIG. 6A illustrates the aircraft 110 climbing at partial power to 4,000 feet, as indicated by target altitude line 116. FIG. 6B illustrates a corresponding portion of the display 130. Because the aircraft is at partial power, the autothrottle mode indicator 155 indicates mode "THR." The pitch mode indicator 145 indicates mode "FLCH SPD." The aircraft is controlled to a target speed of 220 knots, as indicated by the target speed indicator 153. Because the target speed indicator 153 appears at the first pitch mode location 141 (rather than the first autothrottle mode location 151), the pilot receives a visual cue that the pitch controller (and not the autothrottle) is controlling to the target speed.

In another embodiment, shown in FIGS. 7A and 7B, the aircraft 110 can climb at a constant airspeed and a constant altitude change rate (or vertical speed) to a target altitude of 4,000 feet, as indicated by target altitude line 116. Accordingly, the target speed indicator 153 indicates that the autothrottle is controlling to a target speed of 220 knots, and the autothrottle mode indicator 155 indicates that the autothrottle is in mode "SPD." The pitch controller is controlling the elevators of the aircraft to a target altitude change rate of 1,000 feet per minute, as indicated by the text "V/S" at the pitch mode indicator 145, and the numeral 1,000 at a target altitude change rate indicator 147. Because the target speed indicator 153 appears at the autothrottle mode display 150, and because the autothrottle mode indicator 155 is aligned with the aircraft speed display 133, the pilot receives visual cues that the autothrottle is controlling to aircraft speed. Because the pitch mode indicator 145 is aligned with the aircraft altitude display 134, the pilot receives a visual cue that the pitch controller is controlling to a target altitude and altitude change rate.

Figure 8A:
FIG. 8A is a pictorial illustration of an aircraft operating at a constant altitude.
Figure 8B:
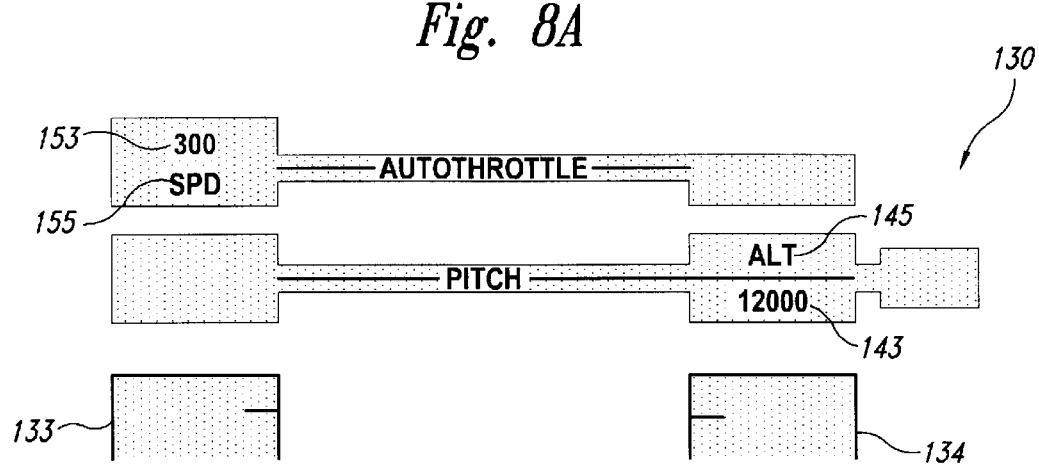
FIG. 8B illustrates a portion of a display having corresponding flight control information in accordance with an embodiment of the invention.

FIG. 8A illustrates the aircraft 110 flying level at a target altitude of 12,000 feet, indicated by the target altitude line 116. FIG. 8B illustrates a portion of the corresponding display 130, in which the autothrottle mode indicator 155 displays mode "SPD" and the target speed indicator 153 indicates that the autothrottle is controlling to a target speed of 300 knots. The target altitude indicator 143 indicates that the pitch controller is controlling to a target altitude of 12,000 feet, and the pitch mode indicator 145 indicates pitch mode "ALT." Again, because the autothrottle mode indicator 155 is aligned with the aircraft speed display 133, and the pitch mode indicator 145 is aligned with the aircraft altitude display 134, the pilot receives visual cues as to the manner in which the aircraft is being flown to achieve and/or maintain flight targets.

Figure 9A:
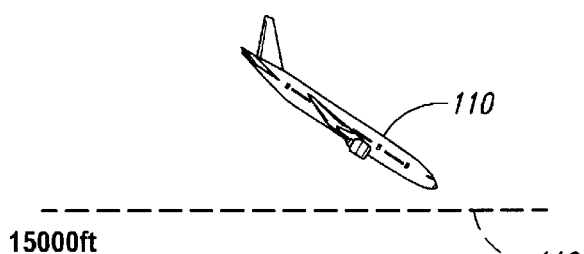
FIG. 9A is a pictorial illustration of an aircraft in a partial power descent.
Figure 9B:
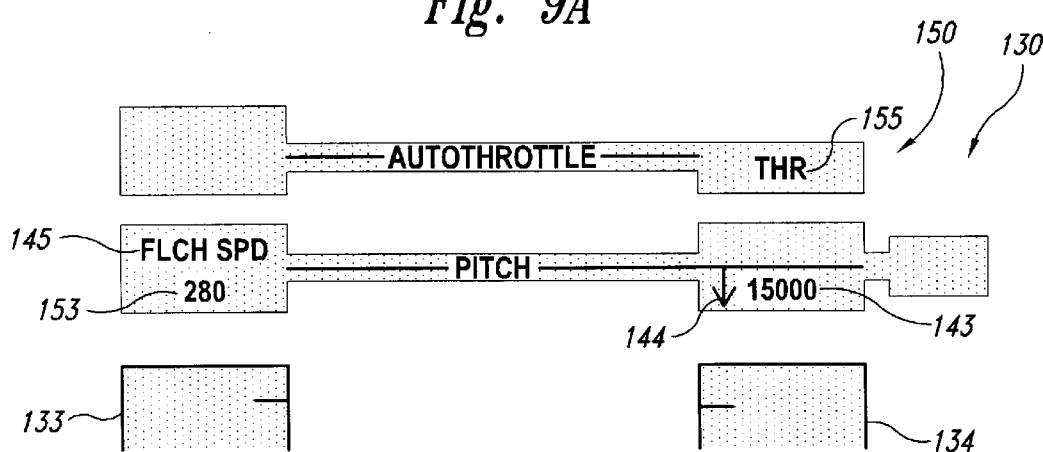
FIG. 9B illustrates a portion of a display having corresponding flight control information in accordance with an embodiment of the invention.

FIG. 9A illustrates the aircraft 110 in a descent to 15,000 feet, as indicated by the target altitude line 116. FIG. 9B illustrates a portion of the corresponding display 130. The pitch direction indicator 144 displays a downward pointing arrow and the target altitude indicator 143 indicates a target altitude of 15,000 feet. The pitch mode indicator 145 displays mode "FLCH SPD" aligned with the aircraft speed display 133, with the elevators controlled to a target air speed of 280 knots, as indicated by the target speed indicator 153. The autothrottle mode display 150 has the autothrottle mode indicator 155 indicating mode "THR," aligned with the aircraft altitude display 134.

Figure 10A:
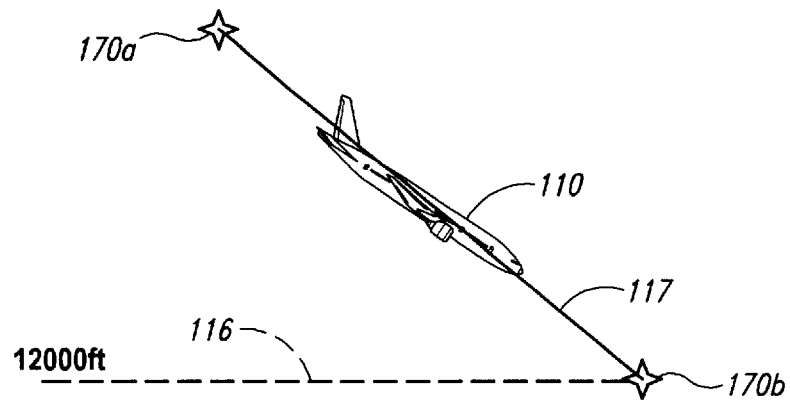
FIG. 10A is a pictorial illustration of an aircraft flying a pre-planned geometric descent path.
Figure 10B:
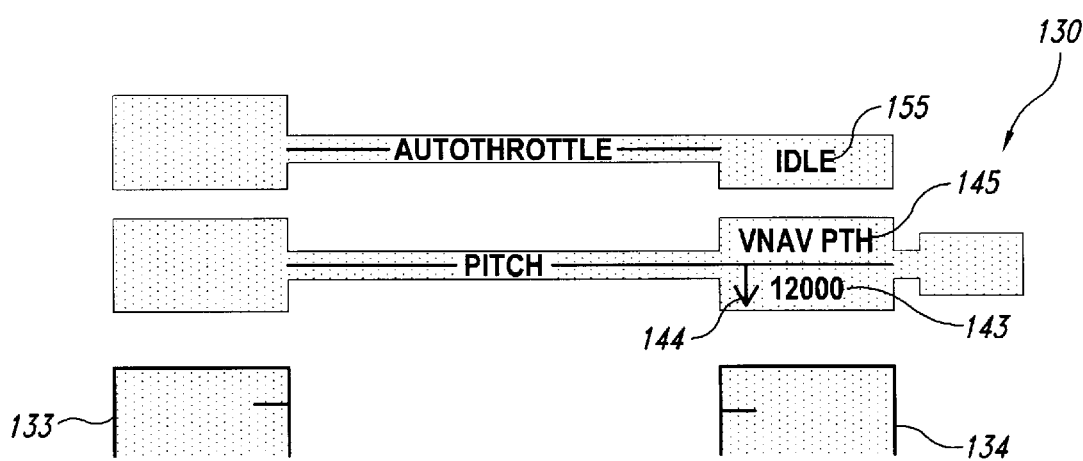
FIG. 10B illustrates a portion of a display having corresponding flight control information in accordance with an embodiment of the invention.

FIG. 10A illustrates the aircraft 110 descending along a geometric path 117 between a first fixed point 170a and a second fixed point 170b to a target altitude of 12,000 feet, as indicated by target altitude line 116. As shown in FIG. 10B, the autothrottle mode indicator 155 indicates the engines at "IDLE" mode for this flight segment. After a predetermined period of time, the autothrottle can go "dormant" and the autothrottle mode indicator 155 can indicate a "HOLD" mode. The pitch direction indicator 144 indicates that the aircraft is descending, and the target altitude indicator 143 indicates that the target altitude is 12,000 feet. The pitch mode indicator 145 indicates a pitch mode of "VNAV PTH," which is aligned with the aircraft altitude display 134. By aligning both the autothrottle mode indicator 155 and the pitch mode indicator 145 with the altitude display 134, the pilot receives a visual cue that neither the autothrottle nor the pitch controller are controlling to a target aircraft speed, but are instead controlling the aircraft to a target flight path.

Figure 11A:
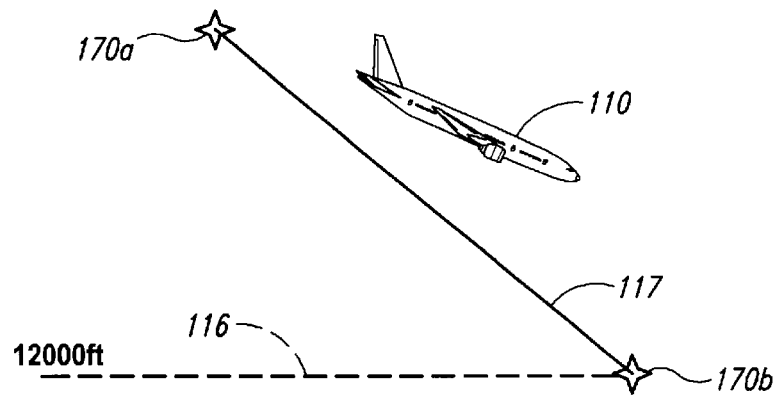
FIG. 11A is a pictorial illustration of an aircraft that has deviated above a pre-planned geometric descent path.
Figure 11A:
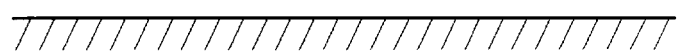
Figure 11B:
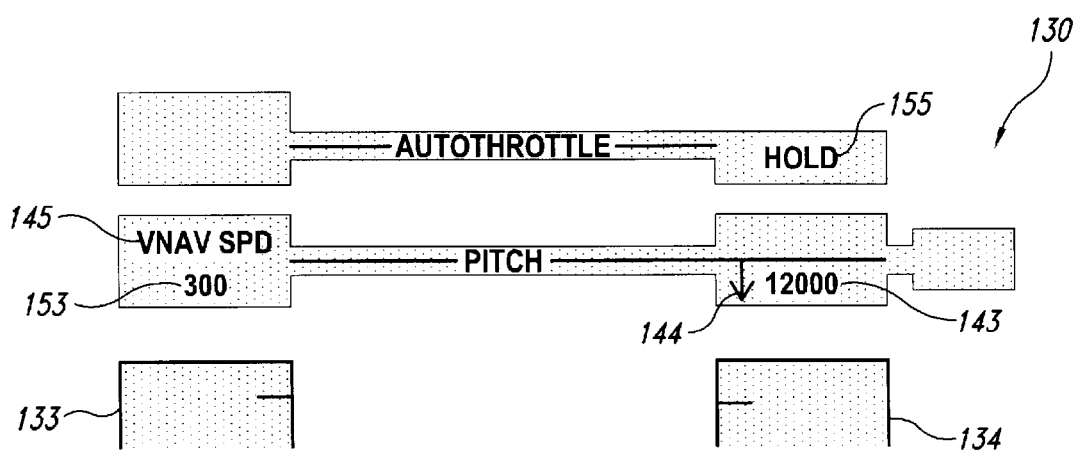
FIG. 11B illustrates a portion of a display having corresponding flight control information in accordance with an embodiment of the invention.

If the aircraft 110 begins to overshoot the target flight path 117 (as indicated in FIG. 11A), the pitch controller shifts from controlling to the target flight path 117 (as was indicated by the pitch mode "VNAV PTH" shown in FIG. 10B) to pitch mode "VNAV SPD," as shown in FIG. 11B. A target airspeed of 300 knots also appears at the target airspeed indicator 153. Both the pitch mode indicator 145 and the target airspeed indicator 153 are aligned with the aircraft speed display 133 to indicate to the pilot that the aircraft 110 is no longer being controlled to a target flight path, and is instead being controlled to a target speed. This situation (commonly referred to as "speed reversion") may occur if the winds change unexpectedly during descent.

Figure 12A:
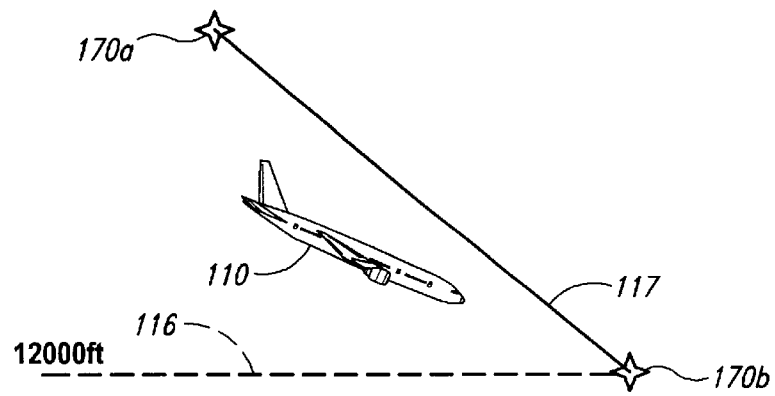
FIG. 12A is a pictorial illustration of an aircraft that has fallen below a pre-planned geometric path.
Figure 12B:
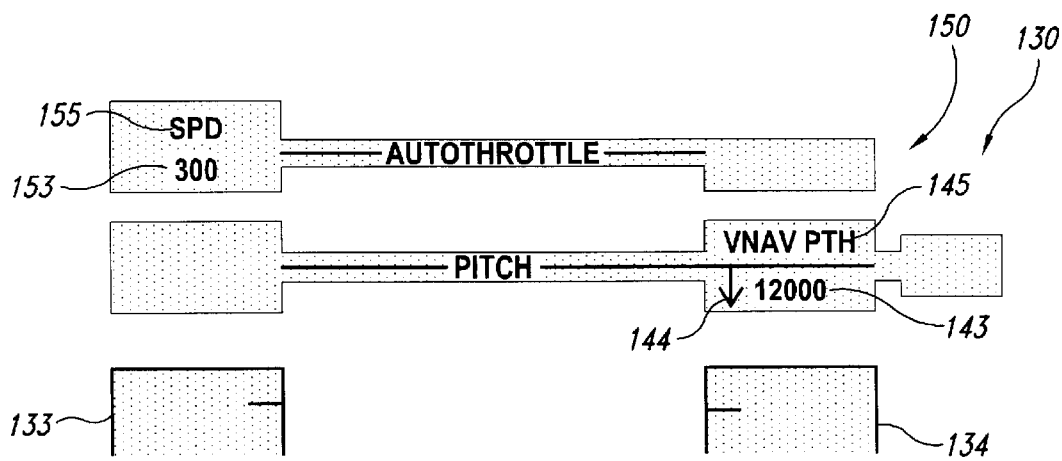
FIG. 12B illustrates a portion of a display having corresponding flight control information in accordance with an embodiment of the invention.

If the aircraft 110 falls below the target flight path 117 (as indicated in FIG. 12A), the pitch controller can remain in the "VNAV PTH" mode described above with reference to FIG. 10B. The autothrottle can "awaken" out of the dormant ("HOLD") mode to increase the aircraft speed to the original speed upon which the target flight path 117 was calculated. Accordingly, the autothrottle mode indicator 155 indicates mode "SPD," and the target airspeed indicator 153 (now positioned at the autothrottle mode display 150) indicates the autothrottle controlling to a target airspeed of 300 knots.

Figure 13A:
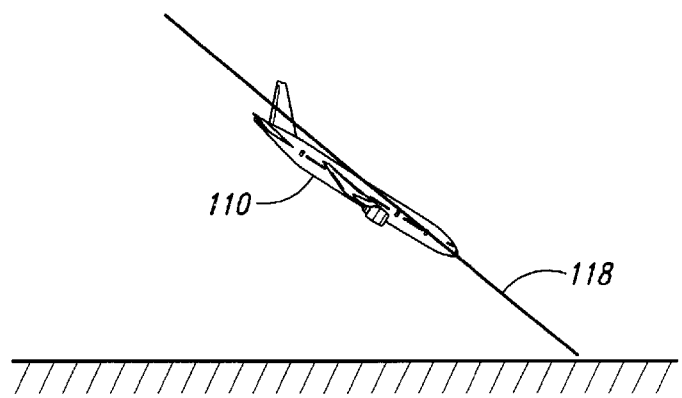
FIG. 13A is a pictorial illustration of an aircraft on an ILS approach.
Figure 13B:
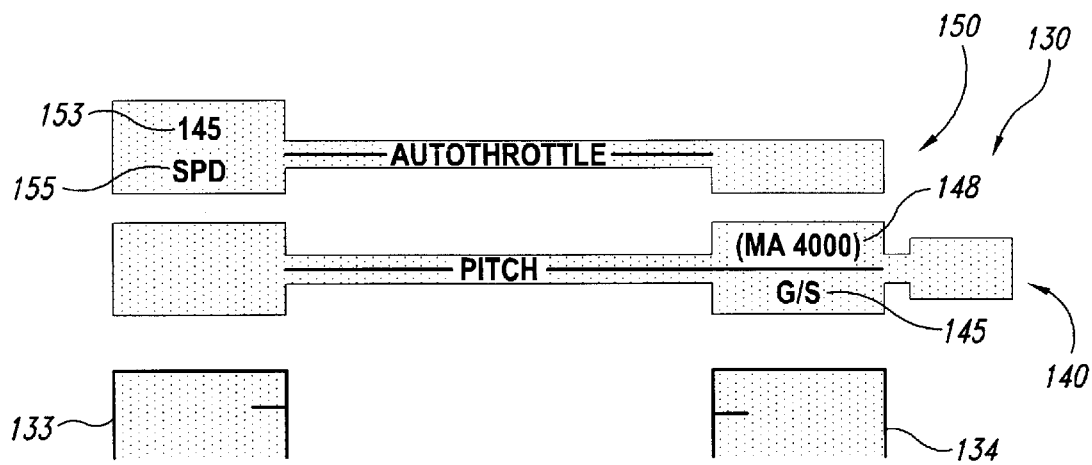
FIG. 13B illustrates a portion of a display having corresponding flight control information in accordance with an embodiment of the invention.

FIG. 13A illustrates the aircraft 110 on approach along an ILS (instrument landing system) glide slope 118. As shown in FIG. 13B, the display 130 can indicate autothrottle mode "SPD" at the autothrottle mode indicator 155, and a target speed of 145 knots at the target speed indicator 153. The pitch mode indicator 145 can display the mode "G/S" (glide slope), without indicating a target altitude because the autopilot is not controlling to a target altitude. However, the pitch mode display 140 can include a missed approach altitude indicator 148, indicating a missed approach altitude of 4,000 feet.

One feature of the foregoing embodiments described above with reference to FIGS. 3A–13B is that the alphanumeric indicators for the flight control modes and the targets to which the flight control devices are controlling can shift position on the display 130, depending upon whether or not the flight control device is controlling to an aircraft speed. Accordingly, both the content and the display location of the alphanumeric information can change when the operational mode of the flight control device changes. An advantage of this feature is that it can provide an intuitive, visual link for the pilot and can help the pilot understand what the flight control devices are doing. A further advantage of this feature is that when the flight control devices change the manner in which they operate, this change is more noticeable to the pilot because the position of the mode description changes, also in a way that creates an intuitive link between the mode and the variable (typically airspeed, altitude, or altitude change rate) to which the flight control device is controlling.

Another feature of embodiments of the systems and methods described above with reference to FIGS. 3A–4 is that information corresponding to the performance of the aircraft engine(s) can be displayed proximate to information corresponding to the operation of the autothrottle and/or the autopilot. For example, the display 130 can include a thrust display 160 that indicates the present thrust limit (as a percentage of the total available thrust), and the actual thrust (also as a percentage of the total available thrust). In one aspect of this embodiment, the thrust information can be displayed textually and/or graphically, and in other embodiments, this information can be represented in other manners. One advantage of this feature is that the performance characteristics for a multi-engine aircraft can be presented in a single, composite display. Accordingly, the pilot can more quickly assess the overall performance level of the aircraft's entire propulsion system. Another advantage of this feature is that the engine performance information can be displayed proximate to the autothrottle and/or autopilot information. Accordingly, the pilot can more easily obtain a comprehensive indication of aircraft performance from a visually compact source, without moving his or her eyes over significant distances.

From the foregoing, it will be appreciated that specific embodiments of the invention have been described herein for purposes of illustration, but that various modifications may be made without deviating from the spirit and scope of the invention. For example, the control devices can control aircraft functions other than aircraft pitch, roll, and thrust, and can have modes other than those described above with reference to FIGS. 3A–13B. Accordingly, the invention is not limited except as by the appended claims.

I/we claim:

1. A computer-implemented method for displaying information corresponding to the operation of an automatic aircraft controller, comprising:

if the automatic aircraft controller is controlling an aircraft function based at least in part on a target aircraft speed, displaying alphanumeric information corresponding to the operation of the automatic aircraft controller at a first location of a display medium; and if the automatic aircraft controller is not controlling the aircraft function based at least in part on the target aircraft speed, displaying the alphanumeric information at a second location of the display medium different than the first location.

2. The method of claim 1 wherein displaying the alphanumeric information at the second location of the display medium includes displaying the alphanumeric information at the second location if the automatic aircraft controller controls the aircraft function based at least in part on at least one of a target aircraft altitude and a target aircraft altitude change rate.

3. The method of claim 1, further comprising:

displaying an aircraft speed at a first region of the display medium;

displaying an aircraft altitude at a second region of a display medium different than the first region of the display medium; and wherein displaying the alphanumeric information at the first location includes displaying at least a portion of the alphanumeric information at least proximate to the first region of the display medium and wherein displaying the alphanumeric information at the second location includes displaying at least a portion of the alphanumeric information at least proximate to the second region of the display medium.

4. The method of claim 1, further comprising displaying an aircraft speed at a first region of the display medium, the first region being elongated along an axis, and wherein displaying the alphanumeric information includes displaying at least a portion of the alphanumeric information aligned with the longitudinal axis.

5. The method of claim 1 wherein the automatic aircraft controller includes an aircraft autopilot configured to control aircraft pitch, and wherein displaying alphanumeric information corresponding to the operation of the automatic aircraft controller includes displaying alphanumeric information corresponding to the operation of the aircraft autopilot.

6. The method of claim 1 wherein the automatic aircraft controller includes an aircraft autothrottle configured to control aircraft engine thrust, and wherein displaying alphanumeric information corresponding to the operation of the automatic aircraft controller includes displaying alphanumeric information corresponding to the operation of the aircraft autothrottle.

7. The method of claim 1 wherein the automatic aircraft controller includes at least one of an aircraft autopilot and an aircraft autothrottle, and wherein the at least one of the aircraft autopilot and the aircraft autothrottle operates according to a plurality of predetermined modes, further wherein displaying alphanumeric information includes displaying alphanumeric information corresponding to an identity of at least one of the modes.

8. The method of claim 1, further comprising displaying an aircraft speed at a first region of the display medium, and displaying at least a portion of the alphanumeric information above the first region of the display medium.

9. The method of claim 1, further comprising:

displaying alphanumeric information having a first content when the automatic aircraft controller is controlling an aircraft function based at least in part on the target aircraft speed; and when the automatic aircraft controller is not controlling the aircraft function based at least in part on the target aircraft speed, ceasing to display the first content and displaying alphanumeric information having a second content different than the first content.

10. The method of claim 1, further comprising:
displaying an aircraft speed at a first region of a display medium elongated along a first axis;
displaying an aircraft altitude at a second region of the display medium different than the first region of the display medium and elongated along a second axis spaced apart from the first axis;
wherein displaying at least a portion of the alphanumeric information includes displaying at least a portion of the alphanumeric information above the first region and aligned with the first axis when the automatic aircraft controller is controlling the aircraft function based at least in part on the target aircraft speed; and
displaying at least a portion of the alphanumeric information above the second region and aligned with the second axis when the automatic aircraft controller is not controlling the aircraft function based at least in part on the target aircraft speed.

11. The method of claim 1 wherein the automatic aircraft controller is a first automatic aircraft controller controlling a first aircraft function, and the alphanumeric information is first alphanumeric information, and wherein the method further comprises:
if a second automatic aircraft controller is controlling a second aircraft function based at least in part on the target aircraft speed, displaying second alphanumeric information corresponding to the operation of the second automatic aircraft controller at a third location of the display medium; and
if the second automatic aircraft controller is not controlling the second aircraft function based at least in part on the target aircraft speed, displaying the second alphanumeric information at a fourth location of the display medium different than the third location.

12. The method of claim 1 wherein displaying the alphanumeric information on a display medium includes displaying the alphanumeric information on a computer display screen.

13. The method of claim 1, further comprising displaying the target aircraft speed at least proximate to the first location of the display medium.

14. The method of claim 1, further comprising displaying a target aircraft altitude at least proximate to the second location of the display medium.

15. The method of claim 1, further comprising displaying a target altitude change rate at least proximate to the second location of the display medium.

16. The method of claim 1, further comprising displaying on the display medium a text indicator of the function provided by the automatic aircraft controller.

17. The method of claim 1 wherein the alphanumeric information includes first information corresponding to the operation of an autopilot, and wherein the method further includes displaying on the display medium second information corresponding to a performance of an aircraft engine controller, the second information including at least one of a thrust limit and actual thrust level and being positioned at least proximate to the first information on the display medium.

18. A computer-implemented method for displaying information corresponding to the operation of an aircraft autopilot, comprising:
if the autopilot is controlling aircraft pitch based at least in part on a target aircraft speed, displaying alphanumeric autopilot information at a first location of a display medium; and
if the autopilot is not controlling aircraft pitch based at least in part on the target aircraft speed, displaying the alphanumeric autopilot information at a second location of the display medium different than the first location of the display medium.

19. The method of claim 18 wherein displaying the alphanumeric autopilot information at the second location includes displaying the alphanumeric information at the second location if the autopilot is controlling aircraft pitch based at least in part on at least one of a target altitude and a target altitude change rate.

20. The method of claim 18 wherein displaying the alphanumeric autopilot information includes displaying at least one of the target aircraft speed, a target altitude, and a target altitude change rate.

21. The method of claim 18, further comprising:
displaying an aircraft speed at a first region of the display medium; and
displaying an aircraft altitude at a second region of the display medium different than the first region of the display medium.

22. The method of claim 18, further comprising:
displaying an aircraft speed at a first region of the display medium; and
displaying an aircraft altitude at a second region of the display medium different than the first region of the display medium, wherein the first region is elongated along an axis and wherein if the autopilot is controlling aircraft pitch based at least in part on the target aircraft speed, displaying the alphanumeric autopilot information includes displaying at least a portion of the alphanumeric autopilot information at the first location, with the first location aligned with the longitudinal axis.

23. The method of claim 18 wherein the autopilot operates according to a plurality of predetermined modes, further wherein displaying alphanumeric autopilot information includes displaying alphanumeric autopilot information corresponding to an identity of at least one of the modes.

24. The method of claim 18, further comprising:
displaying an aircraft speed at a first region of the display medium; and
displaying an aircraft altitude at a second region of the display medium different than the first region of the display medium, and wherein if the autopilot is controlling aircraft pitch based at least in part on the target aircraft speed, displaying at least a portion of the alphanumeric autopilot information includes displaying at least a portion of the alphanumeric autopilot information above the first region of the display medium.

25. The method of claim 18, further comprising:
displaying alphanumeric autopilot information having a first content when the autopilot is controlling an aircraft function based at least in part on the target aircraft speed; and
when the automatic aircraft controller is controlling the aircraft function based at least in part on a target aircraft altitude or a target aircraft altitude change rate, ceasing to display the first content and displaying alphanumeric autopilot information having a second content different than the first content.

26. The method of claim 18, further comprising:
displaying an aircraft speed at a first region of the display medium; and displaying an aircraft altitude at a second region of the display medium different than the first region of the display medium, and wherein
displaying an aircraft speed at a first region of a display medium includes displaying the aircraft speed at a first region elongated along a first axis, and wherein displaying an aircraft altitude at a second region of the display medium different than the first region of the display medium includes displaying the aircraft altitude at a second region elongated along a second axis spaced apart from the first axis, further wherein if the autopilot is controlling aircraft pitch based at least in part on the target aircraft speed, displaying at least a portion of the alphanumeric autopilot information includes displaying at least a portion of the alphanumeric autopilot information above the first region and aligned with the first axis, still further wherein if the autopilot is not controlling aircraft pitch based at least in part on the target aircraft speed, displaying at least a portion of the alphanumeric autopilot information includes displaying at least a portion of the alphanumeric autopilot information above the second region and aligned with the second axis.

27. The method of claim 18 wherein the aircraft includes an autothrottle, and wherein the method further comprises:
if the autothrottle is controlling engine thrust based at least in part on the target aircraft speed, displaying alphanumeric autothrottle information corresponding to the operation of the autothrottle at a third location of the display medium; and
if the autothrottle is not controlling the engine thrust based at least in part on the target aircraft speed, displaying the alphanumeric autothrottle information at a fourth location of the display medium different than the third location.

28. The method of claim 18 wherein displaying the alphanumeric autopilot information on a display medium includes displaying the alphanumeric autopilot information on a computer display screen.

29. The method of claim 18, further comprising:
displaying an aircraft speed at a first region of the display medium; and
displaying an aircraft altitude at a second region of the display medium different than the first region of the display medium, and wherein displaying the target aircraft speed includes displaying the target aircraft speed at least proximate to the first region of the display medium.

30. The method of claim 18, further comprising:
displaying an aircraft speed at a first region of the display medium;
displaying an aircraft altitude at a second region of the display medium different than the first region of the display medium; and
displaying a target aircraft altitude at least proximate to the second region of the display medium.

31. The method of claim 18, further comprising:
displaying an aircraft speed at a first region of the display medium;
displaying an aircraft altitude at a second region of the display medium different than the first region of the display medium; and
displaying a target altitude change rate at least proximate to the second region of the display medium.

32. A computer-implemented method for displaying information corresponding to the operation of an aircraft autothrottle, comprising:
if the autothrottle is controlling an aircraft engine based at least in part on a target aircraft speed, displaying alphanumeric autothrottle information at a first location of a display medium; and
if the autothrottle is not controlling the aircraft engine based at least in part on the target aircraft speed, displaying the alphanumeric autothrottle information at a second location of the display medium different than the first location of the display medium.

33. The method of claim 32 wherein displaying the alphanumeric autothrottle information at the second location includes displaying the alphanumeric information if the autothrottle is controlling the aircraft engine based at least in part on at least one of a target altitude and a target altitude change rate.

34. The method of claim 32 wherein displaying alphanumeric autothrottle information includes displaying at least one of a target altitude, a target altitude change rate and the target aircraft speed.

35. The method of claim 32, further comprising:
displaying an aircraft speed at a first region of the display medium; and
displaying an aircraft altitude at a second region of the display medium different than the first region of the display medium.

36. The method of claim 32, further comprising:
displaying an aircraft speed at a first region of the display medium; and
displaying an aircraft altitude at a second region of the display medium different than the first region of the display medium, wherein the first region is elongated along an axis and wherein if the autothrottle is controlling the aircraft engine based at least in part on a target aircraft speed, displaying the alphanumeric autothrottle information includes displaying at least a portion of the alphanumeric autothrottle information at the first location, with the first location aligned with the longitudinal axis.

37. The method of claim 32 wherein the autothrottle operates according to a plurality of predetermined modes, further wherein displaying alphanumeric autothrottle information includes displaying alphanumeric autothrottle information corresponding to an identity of at least one of the modes.

38. The method of claim 32, further comprising:
displaying an aircraft speed at a first region of the display medium; and
displaying an aircraft altitude at a second region of the display medium different than the first region of the display medium, and wherein if the autothrottle is not controlling the aircraft engine based at least in part on a target speed, displaying at least a portion of the alphanumeric autothrottle information includes displaying at least a portion of the alphanumeric autothrottle information above the second region of the display medium.

39. The method of claim 32, further comprising:
displaying alphanumeric autothrottle information having a first content when the autothrottle is controlling the engine based at least in part on a target aircraft speed; and
when the autothrottle is not controlling the engine based at least in part on a target aircraft speed, ceasing to display the first content and displaying alphanumeric autothrottle information having a second content different than the first content.

40. The method of claim 32, further comprising:
displaying an aircraft speed at a first region of the display medium; and
displaying an aircraft altitude at a second region of the display medium different than the first region of the display medium, and wherein
displaying an aircraft speed includes displaying the aircraft speed at a first region of the display medium elongated along a first axis, and wherein displaying an aircraft altitude at a second region of the display medium different than the first region of the display medium includes displaying the aircraft altitude at a second region elongated along a second axis spaced apart from the first axis, further wherein displaying at least a portion of the alphanumeric autothrottle information includes displaying at least a portion of the alphanumeric autothrottle information above the first region and aligned with the first axis when the autothrottle controls the aircraft engine based at least in part on the target aircraft speed, still further wherein displaying at least a portion of the alphanumeric autothrottle information includes displaying at least a portion of the alphanumeric autothrottle information above the second region and aligned with the second axis when the autothrottle does not control the aircraft engine based at least in part on the target aircraft speed.

41. The method of claim 32 wherein the aircraft includes an autopilot, and wherein the method further comprises:
if the autopilot is controlling aircraft pitch based at least in part on a target aircraft speed, displaying alphanumeric autopilot information corresponding to the operation of the autopilot at a third location of the display medium; and
if the autopilot is not controlling the aircraft pitch based at least in part on a target aircraft speed, displaying the alphanumeric autopilot information at a fourth location of the display medium different than the third location.

42. The method of claim 32 wherein displaying the alphanumeric autothrottle information on a display medium includes displaying the alphanumeric information on a computer display screen.

43. The method of claim 32, further comprising:
displaying an aircraft speed at a first region of the display medium;
displaying an aircraft altitude at a second region of the display medium different than the first region of the display medium; and
displaying the target aircraft speed at least proximate to the first region of the display medium.

44. The method of claim 32, further comprising:
displaying an aircraft speed at a first region of the display medium;
displaying an aircraft altitude at a second region of the display medium different than the first region of the display medium; and
displaying a target aircraft altitude at least proximate to the second region of the display medium.

45. The method of claim 32, further comprising:
displaying an aircraft speed at a first region of the display medium;
displaying an aircraft altitude at a second region of the display medium different than the first region of the display medium; and
displaying a target altitude change rate at least proximate to the second region of the display medium.

46. A computer-implemented method for displaying aircraft flight information corresponding to the operation of an autopilot and an autothrottle, comprising:
if the autopilot is controlling aircraft pitch based at least in part on a target aircraft speed, displaying alphanumeric autopilot information at a first location of a display medium, and if the autopilot is not controlling aircraft pitch based at least in part on the target aircraft speed, displaying the alphanumeric autopilot information at a second location of the display medium different than the first location of the display medium; and
if the autothrottle is controlling an aircraft engine based at least in part on the target aircraft speed, displaying alphanumeric autothrottle information at a third location of a display medium, and if the autothrottle is not controlling the aircraft engine based at least in part on the target aircraft speed, displaying the alphanumeric autothrottle information at a fourth location of the display medium different than the third location of the display medium.

47. The method of claim 46 wherein displaying alphanumeric autothrottle information includes displaying the alphanumeric autothrottle information above the alphanumeric autopilot information.

48. The method of claim 46 wherein displaying alphanumeric autothrottle information includes displaying at least one of a target altitude, a target altitude change rate and the target aircraft speed, and wherein displaying alphanumeric autopilot information includes displaying at least one of the target altitude, the target altitude change rate and the target aircraft speed.

49. The method of claim 46, further comprising:
displaying an aircraft speed at a first region of the display medium; and
displaying an aircraft altitude at a second region of the display medium different than the first region of the display medium.

50. The method of claim 46, further comprising:
displaying an aircraft speed at a first region of the display medium; and
displaying an aircraft altitude at a second region of the display medium different than the first region of the display medium, wherein the first region is elongated along a longitudinal axis and wherein displaying the alphanumeric autothrottle information includes displaying at least a portion of the alphanumeric autothrottle information at the third location, with the third location aligned with the longitudinal axis if the autothrottle is controlling the aircraft engine based at least in part on the target aircraft speed, further wherein displaying the alphanumeric autopilot information includes displaying at least a portion of the alphanumeric autopilot information at the first location, with the first location aligned with the longitudinal axis if the autopilot is controlling aircraft pitch based at least in part on the target aircraft speed.

51. The method of claim 46 wherein the autothrottle operates according to a plurality of predetermined autothrottle modes, further wherein displaying alphanumeric autothrottle information includes displaying alphanumeric autothrottle information corresponding to an identity of at least one of the autothrottle modes, and wherein the autopilot operates according to a plurality of predetermined autopilot modes, further wherein displaying alphanumeric autopilot information includes displaying alphanumeric autopilot information corresponding to an identity of at least one of the autopilot modes.

52. The method of claim 46, further comprising:
displaying an aircraft speed at a first region of the display medium; and
displaying an aircraft altitude at a second region of the display medium different than the first region of the display medium, and wherein displaying at least a portion of the alphanumeric autothrottle information and the alphanumeric autopilot information includes displaying at least a portion of the alphanumeric autothrottle information and the alphanumeric autopilot information above the first region of the display medium.

53. The method of claim 46, further comprising:
displaying alphanumeric autothrottle information having a first content when the autothrottle is controlling the engine based at least in part on a target aircraft speed; and
when the autothrottle is controlling the engine based at least in part on a target aircraft altitude or a target aircraft altitude change rate, ceasing to display the first content and displaying alphanumeric autothrottle information having a second content different than the first content.

54. The method of claim 46, further comprising:
displaying an aircraft speed at a first region of the display medium;
displaying an aircraft altitude at a second region of the display medium different than the first region of the display medium; and wherein
displaying an aircraft speed at a first region of the display medium includes displaying the aircraft speed at a first region elongated along a first axis, and wherein displaying an aircraft altitude at a second region of the display medium different than the first region of the display medium includes displaying the aircraft altitude at a second region elongated along a second axis spaced apart from the first axis, further wherein displaying at least a portion of the alphanumeric autothrottle information includes displaying at least a portion of the alphanumeric autothrottle information above the first region and aligned with the first axis when the autothrottle controls the aircraft engine based at least in part on the target aircraft speed, still further wherein displaying at least a portion of the alphanumeric autothrottle information includes displaying at least a portion of the alphanumeric autothrottle information above the second region and aligned with the second axis when the autothrottle does not control the aircraft engine based at least in part on the target aircraft speed.

55. The method of claim 46 wherein displaying the alphanumeric autothrottle information and the alphanumeric autopilot information on a display medium includes displaying the alphanumeric autothrottle information and the alphanumeric autopilot information on a computer display screen.

56. The method of claim 46, further comprising:
displaying an aircraft speed at a first region of the display medium; and
displaying an aircraft altitude at a second region of the display medium different than the first region of the display medium, and wherein displaying the target aircraft speed includes displaying the target aircraft speed at least proximate to the first region of the display medium.

57. The method of claim 46, further comprising:
displaying an aircraft speed at a first region of the display medium; and
displaying an aircraft altitude at a second region of the display medium different than the first region of the display medium, and wherein displaying the target aircraft altitude includes displaying the target aircraft altitude at least proximate to the second region of the display medium.

58. A computer-implemented method for displaying information corresponding to automatic aircraft control functions, comprising:
displaying an aircraft speed at a first region of a display medium;
displaying an aircraft altitude at a second region of the display medium different than the first region of the display medium;
displaying alphanumeric autopilot mode information at at least one of a first location and a second location of the display medium, the first location being aligned with the first region of the display medium, the second location being aligned with the second region of the display medium, the alphanumeric autopilot mode information corresponding to operation of an aircraft autopilot;
displaying alphanumeric autothrottle mode information at at least one of a third location and a fourth location of the display medium, the third location being aligned with the first region of the display medium, the fourth location being aligned with the second region of the display medium, the autothrottle mode information corresponding to operation of an aircraft autothrottle;
if the autopilot is controlling aircraft pitch based at least in part on a target aircraft speed, displaying at least a portion of the alphanumeric autopilot mode information at the first location of the display medium, and if the autopilot is not controlling aircraft pitch based at least in part on the target aircraft speed, displaying at least a portion of the alphanumeric autopilot mode information at the second location of the display medium; and
if the autothrottle is controlling an aircraft engine based at least in part on the target aircraft speed, displaying at least a portion of the alphanumeric autothrottle mode information at the third location of the display medium, and if the autothrottle is not controlling the aircraft engine based at least in part on the target aircraft speed, displaying at least a portion of the alphanumeric autothrottle mode information at the fourth location of the display medium.

59. The method of claim 58 wherein displaying the aircraft speed at a first region includes displaying the aircraft speed at a first region that is laterally offset from the second region.

60. The method of claim 58 wherein displaying alphanumeric autopilot mode information includes displaying the alphanumeric autopilot mode information above the first and second regions.

61. The method of claim 58 wherein displaying alphanumeric autothrottle mode information includes displaying the alphanumeric autothrottle mode information above the first and second regions.

62. A computer-readable medium whose contents cause a computing device to display information corresponding to the operation of an automatic aircraft control device by performing a method comprising:

receiving information corresponding to the operation of an automatic aircraft control device;

if the control device is controlling an aircraft function based at least in part on a target aircraft speed, displaying alphanumeric information corresponding to the operation of the automatic aircraft control device at a first location of a display medium; and if the control device is not controlling the aircraft function based at least in part on a target aircraft speed, displaying the alphanumeric information at a second location of the display medium different than the first location.

63. The computer-readable medium of claim 62, wherein the method further comprises:

displaying an aircraft speed at a first region of a display medium;

displaying an aircraft altitude at a second region of the display medium different than the first region of the display medium; and wherein displaying the alphanumeric information at the first location includes displaying at least a portion of the alphanumeric information at least proximate to the first region of the display medium and wherein displaying the alphanumeric information at the second location includes displaying at least a portion of the alphanumeric information at least proximate to the second region of the display medium.

64. The computer-readable medium of claim 62 wherein the automatic aircraft control device includes an aircraft autopilot configured to control aircraft pitch, and wherein displaying alphanumeric information corresponding to the operation of the automatic aircraft control device includes displaying alphanumeric information corresponding to the operation of the autopilot.

65. The computer-readable medium of claim 62 wherein the automatic aircraft control device includes an aircraft autothrottle configured to control aircraft engine thrust, and wherein displaying alphanumeric information corresponding to the operation of the automatic aircraft control device includes displaying alphanumeric information corresponding to the operation of the autothrottle.

66. The computer-readable medium of claim 62 wherein the automatic aircraft control device includes at least one of an aircraft autopilot and an aircraft autothrottle, and wherein the at least one of the aircraft autopilot and the aircraft autothrottle operates according to a plurality of predetermined modes, further wherein displaying alphanumeric information includes displaying alphanumeric information corresponding to an identity of at least one of the modes.

67. The computer-readable medium of claim 62, further comprising displaying the target aircraft speed at a first region of the display medium and displaying at least a portion of the alphanumeric information above the first region of the display medium.

68. The computer-readable medium of claim 62 wherein the method further comprises:

displaying alphanumeric information having a first content when the automatic aircraft control device is controlling an aircraft function based at least in part on a target aircraft speed; and when the automatic aircraft control device is not controlling the aircraft function based at least in part on the target aircraft speed, ceasing to display the first content and displaying alphanumeric information having a second content different than the first content.

69. The computer-readable medium of claim 62, further comprising:

displaying an aircraft speed at a first region of the display medium, the first region being elongated along a first axis;

displaying an aircraft altitude at a second region of the display medium different than the first region of the display medium, the second region being elongated along a second axis spaced apart from the first axis, wherein displaying at least a portion of the alphanumeric information includes displaying at least a portion of the alphanumeric information above the first region and aligned with the first axis; and wherein displaying at least a portion of the alphanumeric information includes displaying at least a portion of the alphanumeric information above the second region and aligned with the second axis.

70. The computer-readable medium of claim 62 wherein the automatic aircraft control device is a first automatic aircraft controller controlling a first aircraft function, and the alphanumeric information is first alphanumeric information, and wherein the method further comprises:

if a second automatic aircraft control device is controlling a second aircraft function based at least in part on the target aircraft speed, displaying second alphanumeric information corresponding to the operation of the second automatic aircraft control device at a third location of the display medium; and if the second automatic aircraft control device is not controlling the second aircraft function based at least in part on the target aircraft speed, displaying the second alphanumeric information at a fourth location of the display medium different than the third location.

71. The computer-readable medium of claim 62 wherein displaying the alphanumeric information on a display medium includes displaying the alphanumeric information on a computer display screen.

72. The computer-readable medium of claim 62 wherein displaying the alphanumeric information includes displaying the target aircraft speed.

73. The computer-readable medium of claim 62 wherein displaying the alphanumeric information includes displaying at least one of a target aircraft altitude and target altitude change rate.

74. The computer-readable medium of claim 62 wherein the alphanumeric information is first information corresponding to the operation of an autopilot, and wherein the method further includes displaying on the display medium second information corresponding to a performance of an aircraft engine controller, the second information including at least one of a thrust limit and actual thrust level and being positioned at least proximate to the first information on the display medium.

75. A computer system for displaying information corresponding to the operation of an automatic aircraft controller, comprising:

a display medium capable of displaying the information; and a memory with contents capable of:

displaying alphanumeric information corresponding to the operation of the automatic aircraft controller at a first location of the display medium when the automatic aircraft controller is controlling an aircraft function based at least in part on a target aircraft speed; and displaying the alphanumeric information at a second location of the display medium different than the first location when the automatic aircraft controller is not controlling the aircraft function based at least in part on a target aircraft speed.

76. The system of claim 75 wherein the contents of the memory are capable of:
displaying an aircraft speed at a first region of the display medium; and
displaying an aircraft altitude at a second region of the display medium different than the first region of the display medium.

77. The system of claim 75, further comprising the automatic aircraft control device, and wherein the automatic aircraft control device includes at least one of an autopilot and an autothrottle.

78. The system of claim 75 wherein the automatic aircraft controller includes an aircraft autopilot configured to control aircraft pitch, and wherein the memory is capable of displaying alphanumeric information corresponding to the operation of the autopilot.

79. The system of claim 75 wherein the automatic aircraft controller includes an aircraft autothrottle configured to control aircraft engine thrust, and wherein the memory is capable of displaying alphanumeric information corresponding to the operation of the autothrottle.

80. The system of claim 75 wherein the automatic aircraft controller includes at least one of an aircraft autopilot and an aircraft autothrottle, and wherein the at least one of the aircraft autopilot and the aircraft autothrottle operates according to a plurality of predetermined modes, further wherein the memory is capable of displaying alphanumeric information corresponding to an identity of at least one of the modes.

81. The system of claim 75 wherein the memory is capable of:
displaying alphanumeric information having a first content when the automatic aircraft controller is controlling an aircraft function based at least in part on the target aircraft speed; and
when the automatic aircraft controller is not controlling the aircraft function based at least in part on the target aircraft speed, ceasing to display the first content and displaying alphanumeric information having a second content different than the first content.

82. The system of claim 75 wherein the memory is capable of displaying an aircraft speed at a first region of a display medium elongated along a first axis, and wherein the memory is capable of displaying the aircraft altitude at a second region elongated along a second axis spaced apart from the first axis, further wherein the memory is capable of displaying at least a portion of the alphanumeric information above the first region and aligned with the first axis when the automatic aircraft controller is controlling the aircraft function based at least in part on the target aircraft speed, still further wherein the memory is capable of displaying at least a portion of the alphanumeric information above the second region and aligned with the second axis when the automatic aircraft controller is not controlling the aircraft function based at least in part on the target aircraft speed.

83. The system of claim 75 wherein the automatic aircraft controller is a first automatic aircraft controller controlling a first aircraft function, and the alphanumeric information is first alphanumeric information, and wherein the memory is capable of:
if a second automatic aircraft controller is controlling a second aircraft function based at least in part on the target aircraft speed, displaying second alphanumeric information corresponding to the operation of the second automatic aircraft controller at a third location of the display medium; and
if the second automatic aircraft controller is not controlling the second aircraft function based at least in part on the target aircraft speed, displaying the second alphanumeric information at a fourth location of the display medium different than the third location.

84. The system of claim 75 wherein the memory is capable of displaying the alphanumeric information on a computer display screen.

85. The system of claim 75, wherein the memory is capable of displaying at least one of the target aircraft speed, a target aircraft altitude and a target aircraft altitude change rate.

86. A method for displaying information corresponding to the operation of an automatic aircraft flight controller, comprising:
displaying on a display medium first information corresponding to an operation of at least one of an aircraft autopilot and an aircraft autothrottle; and
displaying on the display medium second information corresponding to a performance of an aircraft engine controller, the second information being positioned at least proximate to the first information on the display medium.

87. The method of claim 86 wherein displaying the second information includes displaying at least one of a thrust limit and an actual thrust level.

88. The method of claim 86 wherein displaying the second information includes displaying a graphical representation of an actual thrust level.

89. The method of claim 86, further comprising:
displaying an aircraft speed at a first region of a display medium;
displaying an aircraft altitude at a second region of the display medium different than the first region of the display medium; and
displaying the second information between and above the first and second regions.

90. The method of claim 86, further comprising:
if the autopilot is controlling an aircraft function based at least in part on a target aircraft speed, displaying the first information at a first location of the display medium; and
if the autopilot is not controlling the aircraft function based at least in part on the target aircraft speed, displaying the first information at a second location of the display medium different than the first location.

* * * * *

UNITED STATES PATENT AND TRADEMARK OFFICE
CERTIFICATE OF CORRECTION

PATENT NO.         : 6,745,113 B2
APPLICATION NO.    : 10/165542
DATED              : June 1, 2004
INVENTOR(S)        : John C. Griffin et al.

Page 1 of 1

It is certified that error appears in the above-identified patent and that said Letters Patent is hereby corrected as shown below:

In the Claims

Column 21, Claim 77,
Line 11, "aircraft control device" should be --aircraft controller--;

Signed and Sealed this
Thirteenth Day of August, 2013

Teresa Stanek Rea
*Acting Director of the United States Patent and Trademark Office*